(12) United States Patent
Tanaka

(10) Patent No.: US 6,283,634 B1
(45) Date of Patent: Sep. 4, 2001

(54) TRANSMISSION FOR AUTOMOBILES AND BEARING THEREFOR

(75) Inventor: Kenji Tanaka, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/547,995

(22) Filed: Apr. 12, 2000

Related U.S. Application Data

(62) Division of application No. 09/226,188, filed on Jan. 7, 1999.

(30) Foreign Application Priority Data

| Jan. 7, 1998 | (JP) | ................................................ H10-1548 |
| Dec. 16, 1998 | (JP) | ............................................ H10-357447 |

(51) Int. Cl.[7] .................................................. F16C 33/80
(52) U.S. Cl. ............................................ 384/480; 384/144
(58) Field of Search .................................. 384/480, 144, 384/46; 74/606 R, 467

(56) References Cited

U.S. PATENT DOCUMENTS

| 1,337,597 | 4/1920 | Gilbert . | |
| 2,011,192 | 8/1935 | Comstock . | |
| 3,550,974 | * 12/1970 | Kupchick | ........................ 308/187.2 |
| 4,309,916 | 1/1982 | Okhuma et al. . | |
| 4,655,617 | 4/1987 | Yasui et al. | ......................... 384/465 |
| 4,783,180 | * 11/1988 | Hayashi | ............................... 384/448 |
| 4,792,242 | * 12/1988 | Colanzi et al. | ....................... 384/482 |
| 4,909,640 | 3/1990 | Nakanishi . | |
| 5,426,988 | 6/1995 | Ohata et al. | .............................. 74/55 |
| 5,435,654 | 7/1995 | Ishida et al. | ......................... 384/488 |
| 5,618,116 | 4/1997 | Ishikawa | ............................... 384/607 |
| 5,649,772 | 7/1997 | Schlereth et al. | .................... 384/484 |
| 5,993,068 | 11/1999 | Suzuki et al. | ........................ 384/450 |

FOREIGN PATENT DOCUMENTS

| 0 683 329 A1 | 11/1995 | (EP) . |
| 1060584 | 3/1967 | (GB) . |
| 1204669 | 9/1970 | (GB) . |
| 51-79252 | 6/1976 | (JP) . |
| 54-95655 | 7/1979 | (JP) . |
| 58-86924 | 6/1983 | (JP) . |
| 60-7326 | 1/1985 | (JP) . |
| 60-89422 | 6/1985 | (JP) . |
| 8-114235 | 5/1996 | (JP) . |

\* cited by examiner

Primary Examiner—David Fenstermacher
(74) Attorney, Agent, or Firm—Crowell & Moring LLP

(57) ABSTRACT

A transmission for automobiles comprising a casing, an input shaft and an output shaft, a power transmission member on the driving side, a power transmission member on the driven side, and a bearing comprising an outer ring, an inner ring, a plurality of balls between the outer and inner rings, and seal rings provided on the opposite ends of the bearing and having an inner peripheral edge fixed to the inner ring and an outer peripheral edge to form a small gap for a labyrinth seal between the outer peripheral edge and the outer ring whereby particle matter can go out of the bearing through the small gap during rotation of the bearing.

5 Claims, 6 Drawing Sheets

TRANSMISSION FOR AUTOMOBILES AND BEARING THEREFOR

This application is a division of application Ser. No. 09/226,188, filed Jan. 7, 1999.

FIELD OF THE INVENTION

The present invention is related to a transmission for automobiles and a bearing for use in the transmission.

BACKGROUND OF THE INVENTION

Generally, a rolling bearing fitted with a seal ring (referred to hereunder as a seal ring fitted rolling bearing) is incorporated for use into a transmission for automobiles, and into a rotational support section of various types of machinery such as machine tools and electrical machines.

The transmission for automobiles of the present invention is provided between an engine and a driven wheel, and is used for changing the ratio between the rotational speed of the engine crank shaft and the rotational speed of the driven wheel. Here the transmission for automobiles, which is the object of the present invention, includes as well as manual transmissions, automatic transmissions of various constructions such as planetary gear systems, belt systems, and toroidal systems.

As a transmission for automobiles incorporating a seal ring fitted rolling bearing, there is disclosed in U.S. Pat. No. 4,309,916 a construction as shown in FIG. 5. This manual type transmission for automobiles shown in outline in FIG. 5 has lubricating oil (transmission oil) 30 contained inside a casing 29, and an input shaft 31 and an output shaft 32 provided concentrically and freely rotatable relative to each other inside the casing 29. Furthermore, a transmission shaft 33 is provided inside the casing 29, parallel with the input shaft 31 and the output shaft 32. The input shaft 31, output shaft 32 and transmission shaft 33 are each rotatably supported by ball bearings 1a with seal rings fitted therein (referred to hereunder as seal ring fitted ball bearings) for serving as rolling bearings.

Of these shafts, the input shaft 31 supports a driving side gear 34 serving as a power transmission member on the driving side. Moreover, the output shaft 32 supports by means of respective synchromesh units (not shown in the figure), driven side gears 35a, 35b, 35c and 35d serving as respective power transmission members on the driven side. At the time of operation, only one of the driven side gears 35a~35d rotates with the output shaft 32, the other driven side gears rotating relative to the output shaft 32. Furthermore, the transmission shaft 33, on the part facing the driving side gear 34 and the respective driven side gears 35a, 35b, 35c and 35d supports respective transmission gears 36a, 36b, 36c, 36d and 36e so as to be rotatable together with the transmission shaft 33. The respective transmission gears 36a, 36b, 36c, 36d and 36e are respectively engaged with the driving side gear 34 and the driven side gears 35a, 35b, 35c and 35d either directly or via an idler gear 37 used for reversing.

In the case of the invention disclosed in the abovementioned U.S. Pat. No. 4,309,916, the respective seal ring fitted ball bearings 1a incorporated into the transmission for automobiles such as described above are sealed type bearings filled with grease. That is to say, for these respective seal ring fitted ball bearings 1a, ones constructed as shown in FIG. 6 are used. This seal ring fitted ball bearing 1a comprises an outer ring 2 and an inner ring 3 disposed concentric with each other, a plurality of balls 4 serving as rolling members, a retainer 5, and a pair of seal rings 6a. An outer ring raceway 7 is provided on a central portion of the inner peripheral face of the outer ring 2, and an inner ring raceway 8 is provided on a central portion of the outer peripheral face of the inner ring 3. The balls 4 are provided between the outer ring raceway 7 and the inner ring raceway 8 and are retained by the retainer 5 so as to be freely rotatable. Due to the rotation of the plurality of balls 4, the outer ring 2 and the inner ring 3 are freely rotatable relative to each other.

Moreover, anchoring grooves 9 are formed on opposite end portions on the inner periphery of the outer ring 2 around the whole periphery. A pair of ring shaped seal rings 6a are provided the outer peripheral rim portions of which are anchored in the respective anchoring grooves 9. The seal rings 6a are formed in an overall ring shape from respective ring shaped metal rings 14 and resilient material 15 such as rubber like elastomer etc. The resilient material 15 has seal lips 13 the tip edge rims of which are provided on the inner peripheral rims of the resilient material 15 to go into respective recesses 12 formed around the whole periphery of outer peripheral face portions on the opposite ends of the inner ring 3, and come into sliding contact with a portion of these recesses 12.

In the case of the seal ring fitted ball bearing 1a constructed as described above, communication between a space 16 in which the balls 4 are disposed and the outer space outside of the space 16 is shut off. Hence foreign matter existing outside cannot enter into the space 16. Therefore, any increase in wear due to foreign matter at the contact portions between the outer ring raceway 7 and the inner ring raceway 8 and the rolling surfaces of the balls 4 is prevented, thus enabling an increase in the rolling fatigue life of the seal ring fitted ball bearing 1a.

With the rolling bearing incorporated into a transmission for automobiles as described above for rotatably supporting the shafts 31, 32 and 33, prior to the invention disclosed in U.S. Pat. No. 4,309,916, a so called open type ball bearing 38 having no seal rings as shown in FIG. 7, was used. Lubrication of this ball bearing 38 is effected by circulation of lubricating oil 30 (FIG. 5) contained inside the casing 29. However, hard foreign matter such as wear debris and shavings from the respective gears 34, 35a, 35b, 35c and 35d, 36a, 36b, 36c, 36d and 36e and 37 is mixed into the lubricating oil 30, and this foreign matter damages the outer ring raceway 7, the inner ring raceway 8, and the rolling surfaces of the balls 4 giving an increase in wear, so that the endurance of the ball bearing 38 is compromised. On the other hand, in the case of the above described seal ring fitted ball bearing 1a shown in FIG. 6, this foreign matter does not damage the outer ring raceway 7, the inner ring raceway 8 and the rolling surfaces of the balls 4, and hence the rolling fatigue life can be increased.

In the case of the seal ring fitted ball bearing 1a shown in FIG. 6, the seal rings 6a made up of the metal ring 14 and the resilient material 15 are used. Furthermore, lubricating grease is filled in the interior and hence cost is increased. Specifically, since the seal rings 6a are a tight seal having substantially no gap, it takes a substantially long time before the lubricant oil existing around the seal ring fitted ball bearing 1a enter the interior of the seal ring fitted ball bearing 1a for lubrication. Accordingly, the grease must be filled in it. In addition, when the lubricating oil 30 inside the casing 29 of the transmission for automobiles is exchanged, this grease remains unchanged. Consequently, lubrication of the seal ring fitted ball bearing 1a must be effected by the initially introduced grease, even though the lubricating oil 30 is exchanged several times. It is therefore necessary to use an expensive grease having a very long life, thus causing an increase in the overall cost of the seal ring fitted ball bearing 1a. Moreover, in the case of the seal ring fitted ball bearing 1a, since the seal lips 13 rub against the recesses 12, rotational torque is increased.

In view of the above situation, the present inventors have considered using a construction such as shown in FIG. 8 as a seal ring fitted ball bearing incorporated into the rotational support sections of various mechanical equipment such as transmissions for automobiles. In the case of the seal ring fitted ball bearing 1 shown in FIG. 8, a pair of ring shaped seal rings 6 are provided the outer peripheral rims of which are anchored in the anchoring grooves 9 formed in inner peripheral face portions on the opposite ends the outer ring 2 around the whole periphery thereof. That is to say, bent back portions 10 on the outer diameter side are formed on the outer peripheral rim portions of the thin metal plate seal rings 6, by bending back the outer peripheral rim portions of the thin metal plate to give an arcuate shape in cross-section, and the bent back portions 10 on the outer diameter side are tightly crimped into the anchoring grooves 9 so that the seal rings 6 are securely supported on the outer ring 2.

Moreover, bent portions 11 are formed on the inner peripheral rims of the seal rings 6, and the inner peripheral faces of these bent portions 11 face recesses 12 formed in the outer peripheral faces of opposite end portions of the inner rings 3 around the whole periphery thereof. These recesses 12 and bent portions 11 of the seal rings 6 constitute labyrinth seals, and prevent the ingress of external foreign matter into the space 16 between the inner peripheral face of the outer ring 2 and the outer peripheral face of the inner ring 3, in which the balls 4 are disposed.

In the case where a seal ring fitted ball bearing 1 constructed as described above is used for example for supporting the shafts 31, 32 and 33 constituting a transmission for automobiles such as shown in FIG. 5, the lubricating oil 30 contained inside the casing 29 is circulated inside the space 16 in which the balls 4 are disposed to thereby lubricate the contact portions of the outer ring raceway 7, the inner ring raceway 8 and the rolling faces of the balls.

The present inventors used the seal ring fitted ball bearing 1 as shown in FIG. 8 for supporting the various shafts 31, 32 and 33 constituting a transmission for automobiles such as shown in FIG. 5, and carried out experiments to determine the endurance. Instead of being better than for the case where the open type ball bearing 38 such as shown in FIG. 7 was used, the endurance was worse. While researching the reason for this, the present inventors identified the following cause. That is to say, in the case of the seal ring fitted ball bearing 1 shown in FIG. 8, the ingress of foreign matter to inside the space 16 can not be completely prevented by the labyrinth seal made up of the recesses 12 and the bent portions 11 of the seal rings 6. Furthermore, the foreign matter entering into the space 16, accumulated at the outer diameter side of the space 16 due to centrifugal force, and was blocked by the seal rings 6 from being discharged from inside the space 16, thus remaining thereinside. As a result, wear due to the foreign matter was increased at the contact portions of the outer ring raceway 7 and the inner ring raceway 8, and the rolling faces of the balls 4, thus shortening the rolling fatigue life of the seal ring fitted ball bearing 1.

On the other hand, in Japanese Patent Publication TOKU-KAIEI No. 8-114235, and Japanese Utility Model Publication JITSUKAISHO Nos. 51-79252, 54-95655, 58-86924, 60-7326, and 60-89422, a seal ring fitted ball bearing is disclosed where the inner peripheral rims of seal rings are anchored in the outer peripheral surfaces on the end portions of an inner ring, and a labyrinth seal is provided between the outer peripheral rims of the seal rings and the inner peripheral surfaces of the end portions of an outer ring. However, with the seal ring fitted ball bearings disclosed in these publications, no consideration is given to lubrication using lubricating oil which is contaminated with hard foreign matter such as the wear debris and shavings from gears, such as with the transmission for automobiles.

SUMMARY OF THE INVENTION

An object of the present invention is to provide a transmission for automobiles and a bearing for use in the transmission, taking the above situation into consideration, which can be provided at a low cost with long life and minimal rotation torque, and with minimal drive power transmission loss and excellent endurance, even in the case where lubrication is carried out using lubricating oil where there is the possibility of hard foreign matter contamination.

PREFERRED EMBODIMENTS OF THE INVENTION

According to one embodiment of the present invention, the seal ring fitted rolling bearing comprises an outer ring having an inner peripheral face formed with an outer ring raceway, an inner ring having an outer peripheral face formed with an inner ring raceway, a plurality of rolling members provided between the outer ring raceway and the inner ring raceway, and a pair of seal rings formed generally in a circular shape to cover the openings on the opposite ends of the space between the inner peripheral.face of the outer ring and the outer peripheral face of the inner ring where the rolling members are provided, which is similar to the prior art seal ring fitted rolling bearings.

In the seal ring fitted rolling bearing of the embodiment, the contact portions between the outer ring raceway, inner ring raceway and rolling faces of the rolling members are lubricated by supply of lubricant oil in the space which hard foreign matter may enter from outside during use.

At least one of the seal rings has an inner peripheral edge which is anchored and fixed in a portion of the outer peripheral face of the inner ring at the end thereof away from the inner ring raceway, and its outer peripheral edge is located close to the end edge faces of the outer ring, so that there is a small gap between the outer peripheral edge of the aforementioned seal ring and the end edge face of the outer ring which allow the hard foreign matter mixed in the lubricant oil to pass therethrough. Further, with centrifugal force produced during use, the lubricant oil supplied in the space can be discharged outside the space through the small gap together with the hard foreign matter mixed in the lubricant oil. This reduces the amount of foreign matter mixed in the lubricant oil for lubrication of the contact portions between the outer ring raceway, inner ring raceway and the rolling faces of the rolling members, preventing the reduction in rolling fatigue life due to the foreign matter.

Further, according to another embodiment of the present invention, a transmission for automobiles comprises a casing in which lubricant oil is reserved, input and output shafts each rotatably supported by a bearing(s) in the casing, respectively, a power transmission member on the driving side supported by the input shaft to rotate with the input shaft, and a power transmission member on the driven side supported by the output shaft to be engaged with the power transmission member on the driving side for power transmission, and to rotate with the output shaft as the input shaft rotates, which is similar to the conventional transmission for automobiles.

In this embodiment, the transmission for automobiles uses the seal ring fitted rolling bearing of the embodiment mentioned above. Therefore, the endurance of the transmission for automobiles is improved.

Figure 1:
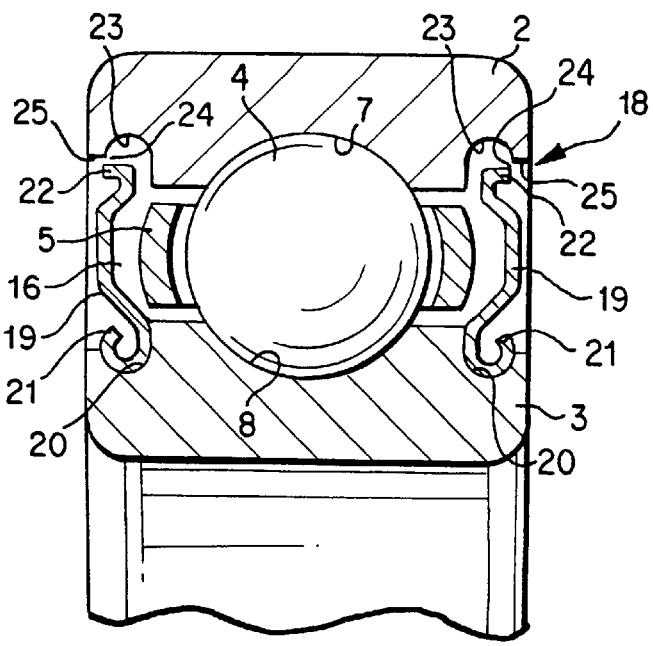
FIG. 1 is a cross sectional partial view of an example of the embodiments of the seal ring fitted rolling bearing of the present invention.

Now, FIG. 1 shows a first example of an embodiment of the present invention. One feature of the present invention is the point that the inner peripheral rim portions of a pair of seal rings 19 are anchored and secured to the outer peripheral faces on opposite ends of an inner ring 3.

Another feature of the present invention is the point that, due to the construction as mentioned above, small gaps 24 are formed between the outer peripheral rim portions of the seal rings 19 and the inner peripheral faces 25 on the end portions of an outer ring 2, so that during use, it is difficult for foreign matter to enter into a space 16 and that any foreign matter that has entered is discharged to outside of the space 16 from the small gaps 24 together with lubricating oil supplied to the space 16, due to the centrifugal force added during use.

Figure 6:
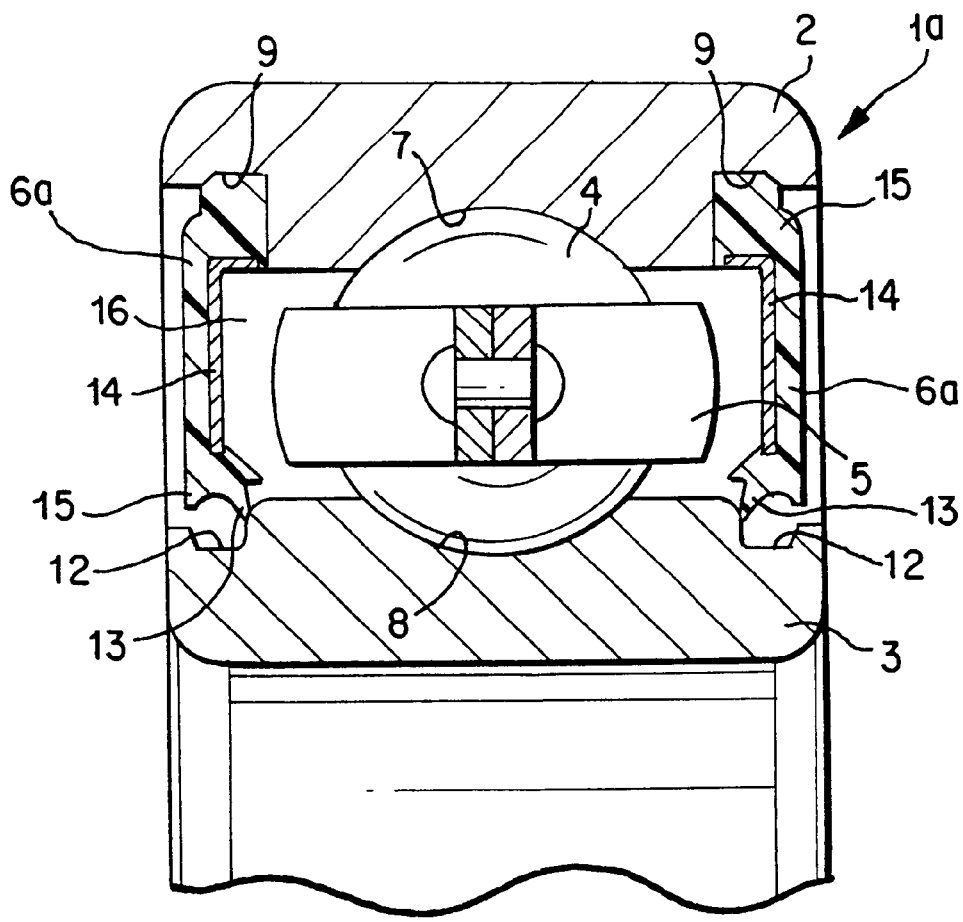
FIG. 6 is a cross sectional view of an example of the embodiments of the seal ring fitted rolling bearing incorporated into the transmission for automobiles of FIG. 5.
Figure 8:
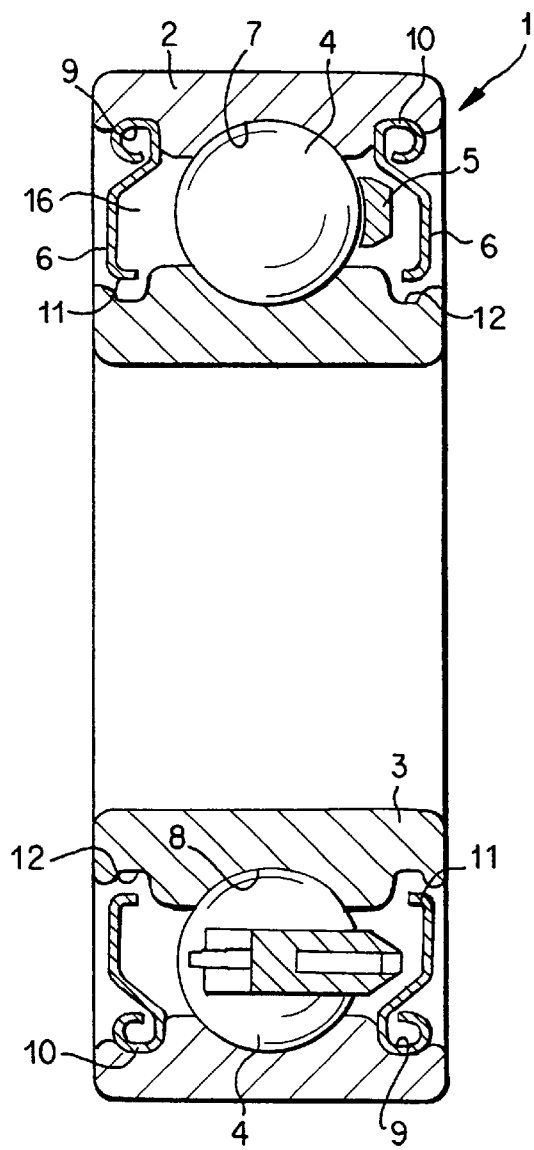
FIG. 8 is a cross sectional view of an example of the embodiments of the seal ring fitted rolling bearing having a small gap on the side of the inner peripheral edge.

Other details of the construction and operation are the same as for the conventional construction shown in FIG. 6 and FIG. 8, and hence similar components are denoted by the same symbols and repeated description is omitted or abbreviated. Hereunder the description is centered on the characteristic parts of the present invention.

Anchoring grooves 20 are formed in the outer peripheral face of the inner ring 3 at opposite end portions away from the inner ring raceway 8, around the whole periphery. Furthermore, there is a pair of seal rings 19, each made from a thin metal plate and ring shaped, the inner peripheral rims of which are anchored and secured to the respective anchoring grooves 20.

That is to say, a bent back portion 21 on the inner diameter side is formed on the inner peripheral rim portion of each of the seal rings 19, by bending back the inner peripheral rim portion of the thin metal plate to give an arcuate shape in cross-section. Moreover, the bent back portions 21 on the inner diameter side are tightly crimped onto the anchoring grooves 20, so that the seal rings 19 are securely supported on the outer peripheral faces of the opposite end portions of the inner ring 3.

Furthermore, a bent portion 22 is formed on the outer peripheral rim of each of the seal rings 19. The outer peripheral faces of these bent portions 22 are made close to the end edge faces, that is the inner peripheral faces 25 of the opposite end portions of the outer ring 2 around the whole periphery.

Moreover, formed between the outer peripheral rim portions of the seal rings 19 and the inner peripheral faces 25 of the opposite end portions of the outer ring 2 around the whole periphery are small gaps 24 which freely allow the passage of foreign matter mixed in the lubricating oil.

Furthermore, recesses 23 are formed around the whole periphery in the inner peripheral face of the outer ring 2 at the portions on the axially inner side than the inner peripheral faces 25 of the end portions (on the axial center side of the seal ring fitted ball bearing 18).

The outer peripheral faces of the bent portions 22 are made to face these recesses 23, thus making up a labyrinth seal. Hence the entry of foreign matter existing outside into the space 16 in which the respective balls 4 are disposed between the inner peripheral face of the outer ring 2 and the outer peripheral face of the inner ring 3 is prevented (kept to a minimum).

Figure 5:
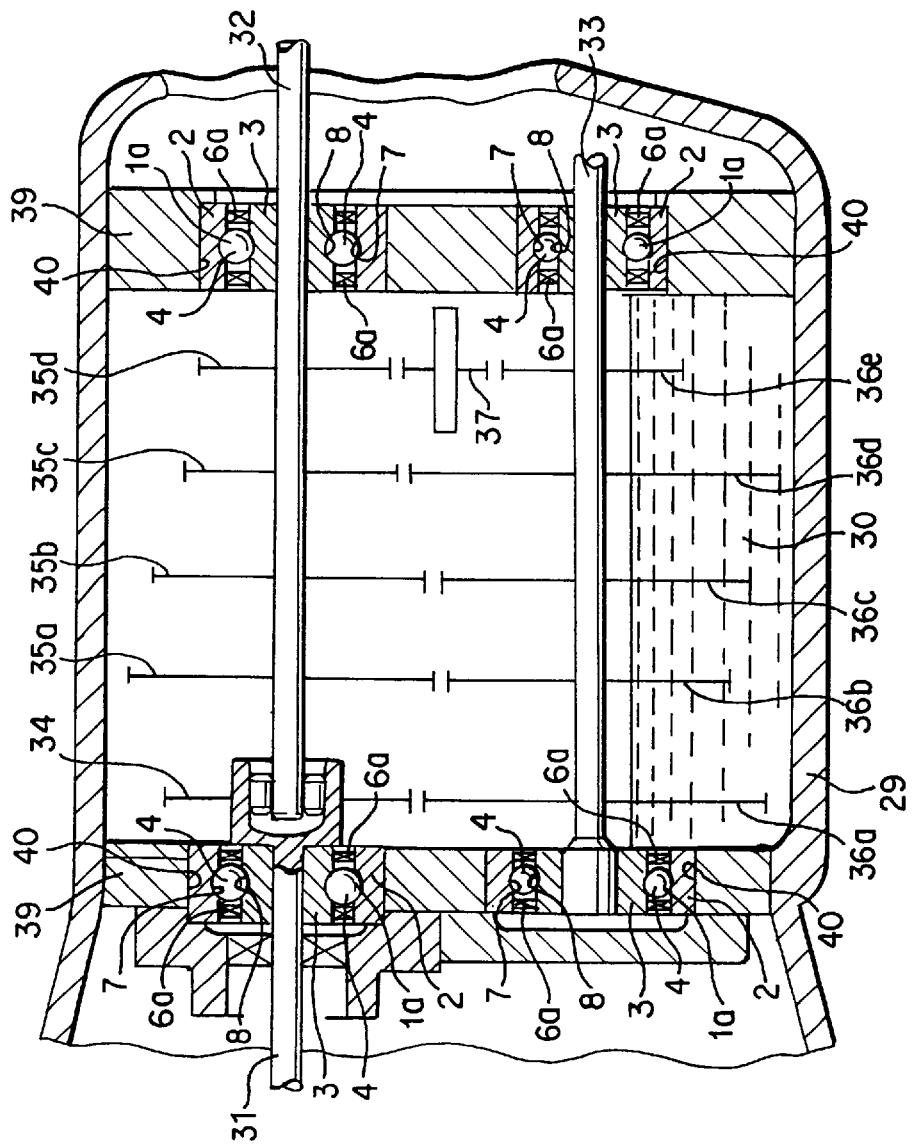
FIG. 5 is a diagrammatic cross sectional view of an example of the embodiments of the transmission for automobiles in which a seal ring fitted rolling bearing in the prior art is incorporated.

In the case where the seal ring fitted ball bearing 18 of the present example constructed as described above is incorporated into for example a transmission for automobiles such as shown in FIG. 5, the inner rings 3 are externally secured to the respective shafts 31, 32 and 33, and the outer rings 2 are internally fixed to support bores 40 formed in parts such as support walls 39 secured to the casing 29.

At the time of operating the transmission for automobiles, the lubricating oil 30 contained inside the casing 29 is agitated by the respective gears 34, 35a, 35b, 35c and 35d, 36a, 36b, 36c, 36d and 36e and 37, or is supplied to close to the seal ring fitted ball bearings 18 by means of an oil supply pump (not shown in the figure), and passes through the respective small gaps 24 into the space 16, thereby lubricating the contact portions of the outer ring races 7, the inner ring races 8 and the rolling faces of the balls 4.

During operation of the transmission for automobiles, when the inner ring 3 rotates with rotation of the respective shafts 31, 32 and 33, the seal rings 19 securely anchored with the outer peripheral face portions on the ends of the inner ring 3, rotates together with the balls 4. With the rotation of the inner rings 3, the seal rings 19 and the balls 4, the lubricating oil existing inside the space 16 also rotates, so that a centrifugal force is imparted to the lubricating oil. As a result, the lubricating oil moves to the outer diameter side of the space 16 (toward the inner peripheral face side of the outer ring 2), and is then discharged from the respective small gaps 24 to outside of the space 16. At this time, foreign matter mixed in the lubricating oil is discharged together with the lubricating oil to outside of the space 16.

In particular, wear debris and shavings with a higher specific gravity than the lubricating oil are effectively discharged, passing through the small gaps 24 to outside of the space 16.

Moreover, during operation of the transmission for automobiles, lubricating oil is continuously supplied to inside the space 16, and hence lubrication of the contact portions of the outer ring raceway 7 and the inner ring raceway 8 and the rolling faces of the balls 4 is suitably carried out. That is to say, during operation of the transmission for automobiles, lubricating oil is continuously supplied to inside the space 16, and is successively discharged.

While it is possible for a small quantity of wear debris and shavings to be mixed with the lubricating oil supplied to inside of the space 16, since wear debris and shavings of a high specific gravity are effectively discharged, there is a tendency for only lubricating oil which is not mixed with such wear debris and shavings to remain inside the space 16, and hence damage to the outer ring raceways 7 and the inner ring raceways 8 and the rolling surfaces of the respective balls 4 is minimized.

When using the seal ring fitted ball bearing 18, then also in the case where the outer ring 2 rotates, based on the revolving movement of the balls 4, a centrifugal force is imparted to the lubricating oil. Consequently, as with the case where the inner ring 3 rotates, the lubricating oil contaminated with foreign matter is discharged from the small gaps 24 to outside of the space 16.

The supply of lubricating oil to inside the space 16, as well as being carried out via the small gaps 24 as mentioned above, can also involve supply from the inner peripheral rim side of the seal rings 19. That is to say, a splash method where lubricating oil is splashed towards the inner peripheral rim portions of the seal rings 19 from an external space existing outside of the space 16, or an oil bath method where the seal ring fitted ball bearing 18 is used with part thereof immersed in the lubricating oil 30 (FIG. 5) contained inside the casing 29 (the condition where the lubricating oil reaches as far as a part of the inner peripheral rim portions of the seal rings 19) is adopted.

For example in the case of the present example, the supply of lubricating oil to inside the space 16 can be carried out through a gap between the bent back portions 21 on the inner diameter side formed on the inner peripheral rim portions of the seal rings 19, and the respective anchoring grooves 20. That is to say, a small oil supply gap through which only lubricating oil can pass and foreign matter cannot pass is provided in the engaging portions between the bent back portions 21 and the respective anchoring grooves 20, so that lubricating oil can freely flow to inside the space 16 via this oil supply gap.

Here such a small oil supply gap is formed for example by small undulations provided on at least one face of the mutually opposing faces of the bent back portions 21 on the inner diameter side and the anchoring grooves 20.

Figure 2:
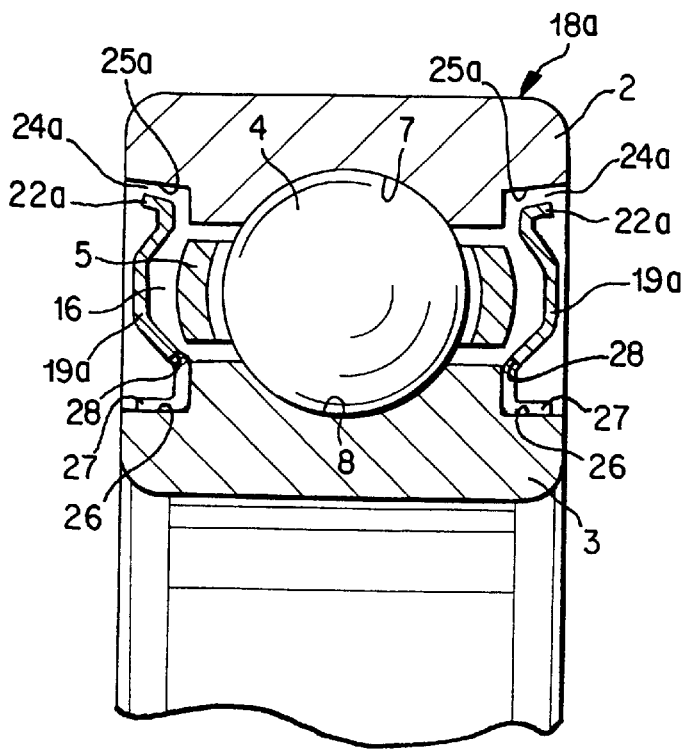
FIG. 2 is a cross sectional partial view of another example of the embodiments of the seal ring fitted rolling bearing of the present invention.

FIG. 2 shows a second example of an embodiment of the present invention. With this example, the point that differs from the abovementioned first example is that a small gap 24a is formed in a conical cylinder shape.

Therefore, with this example, the bent back portions 22a with their diameters increasing towards the respective widthwise end portions of the seal ring fitted ball bearing 18a, are formed on the respective outer peripheral rims of the pair of seal rings 19a. Moreover, the inner peripheral faces 25a on the opposite ends of the outer ring 2 are formed in a conical concave shape, and the respective outer peripheral faces of the bent back portions 22a face close to the inner peripheral faces 25a, around the whole periphery.

The small gaps 24a through which foreign matter mixed in the lubricating oil can pass freely, are formed around the whole periphery between the outer peripheral rim portions of the seal rings 19a and the inner peripheral faces 25a of the end portions.

The diameter of these small gaps 24a which make up labyrinth seals, increases with distance from the space 16, so that the lubricating oil supplied to inside the space 16, is effectively discharged freely together with foreign matter contained therein to away from the space 16, due to centrifugal force.

Step portions 26 are formed in the outer peripheral face of an inner ring 3 at opposite end portions away from the inner ring raceway 8, around the whole periphery.

Furthermore, the inner peripheral rims of the seal rings 19a, each ring shaped, are externally secured to the respective step portions 26. That is to say, the bent back portions 27 on the inner diameter side are formed by bending back the inner peripheral rim portions of the seal ring 19a made from a thin metal plate to give an L-shape in cross-section. The bent back portions 27 on the inner diameter side are externally fitted to the step portions 26 so that the seal rings 19a are securely supported on the inner ring 3.

Furthermore, through holes 28 are provided at a plurality of locations around the periphery of the bent back portions 27 on the inner diameter side serving as passages for communicating between the space 16 and the external space existing around the seal ring fitted ball bearing 18a. The shape of the through holes 28 is optional being for example circular or slit shape.

In the case of the seal ring fitted ball bearing 18a of this example constructed as described above, the small gaps 24a are formed in a conical cylinder shapes with their diameters increasing towards the opposite end portions of the seal ring fitted ball bearing 18a. Therefore, in the case of this example, the lubricating oil entering the small gaps 24a is effectively discharged towards the external space. That is to say, due to the centrifugal force acting on the lubricating oil existing inside the small gaps 24a, a diametrically outward directed force (in the upward direction in FIG. 2) is applied to the lubricating oil. Due to this force, discharge of the lubricating oil can be effectively carried out.

Moreover, supply of lubricating oil to inside the space 16 is carried out from the through holes 28.

Other details of the construction and operation are the same as for the case of the above described first example including the case where this is fitted to the rotation support sections of a transmission for automobiles, and hence similar components are denoted by the same symbols, and repeated description is omitted.

Figure 3:
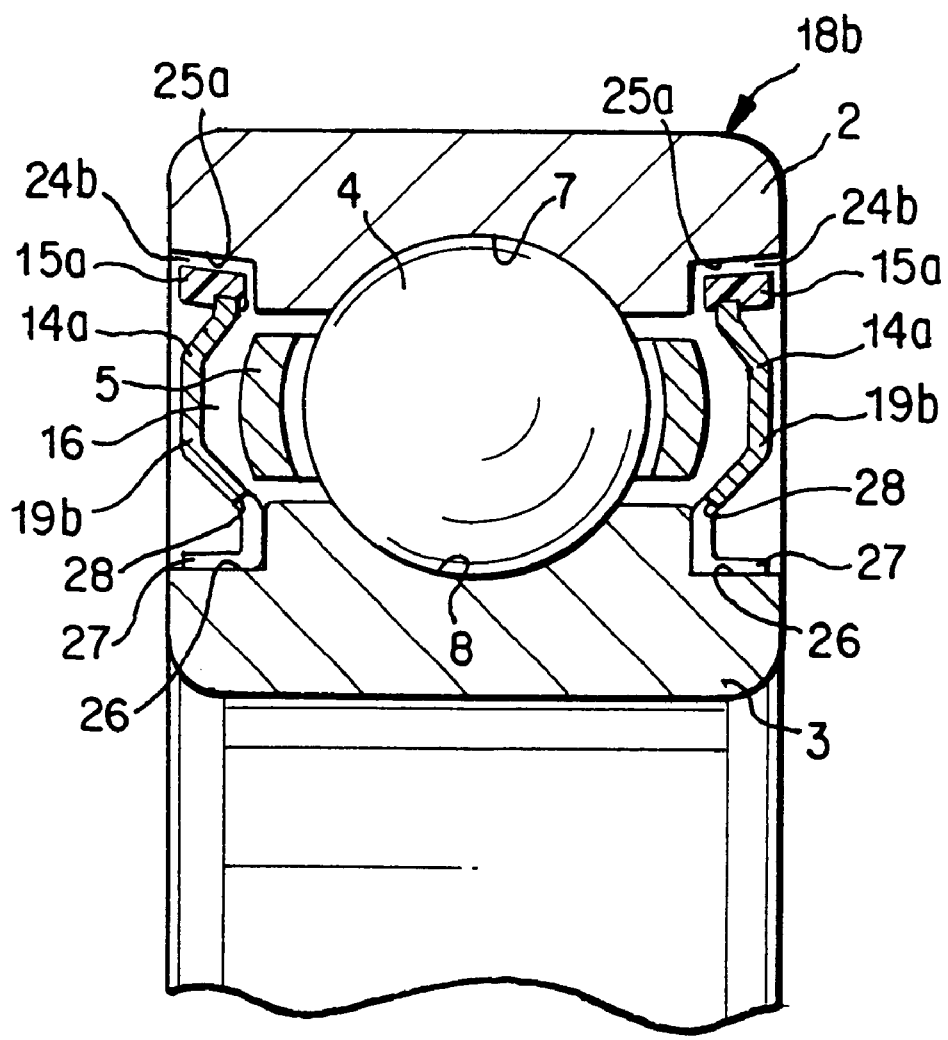
FIG. 3 is a cross sectional partial view of another example of the embodiments of the seal ring fitted rolling bearing of the present invention.

FIG. 3 shows a third example of an embodiment of the present invention. In the case of the seal ring fitted ball bearing 18b of this example, resilient material 15a such as rubber or synthetic resin or the like is bonded to the outer peripheral rim portions of the pair of seal rings 19b around the whole periphery. That is to say, the seal rings 19b are made up of metal rings 14a and the resilient material 15a. Moreover, the outer peripheral faces of the resilient material 15a are positioned close to the inner peripheral faces 25a on the end portions of the outer ring 2 around the whole periphery.

Furthermore, the small gaps 24b through which foreign matter mixed in the lubricating oil can pass freely are formed between the outer peripheral rims of the seal rings 19b and the inner peripheral faces 25a of the end portions of the outer ring 2, around the whole periphery.

The resilient material 15a is finished with accurate dimensions (outer diameter) by mould forming to the outer peripheral rim of the metal rings 14a. Furthermore, even though part of the resilient material 15a may rub against part of the outer ring 2, there is practically no loss of function of the seal ring fitted ball bearing 18b. Consequently in the case of this example, the width of the small gaps 24b is made smaller than the width of the small gaps 24a of the above-mentioned second example, so that the ingress of foreign matter through the small gaps 24b to inside the space 16 can be more effectively prevented.

In the case of the seal ring fitted ball bearing 18b of the example constructed as described above, since the small gaps 24b can be made small, the sealing by the seal rings 19b can be improved.

Other details of the construction and operation are the same as for the case of the above described second example including the case where this is fitted to the rotation support sections of a transmission for automobiles, and hence similar components are denoted by the same symbols, and repeated description is omitted.

Working Examples

Figure 7:
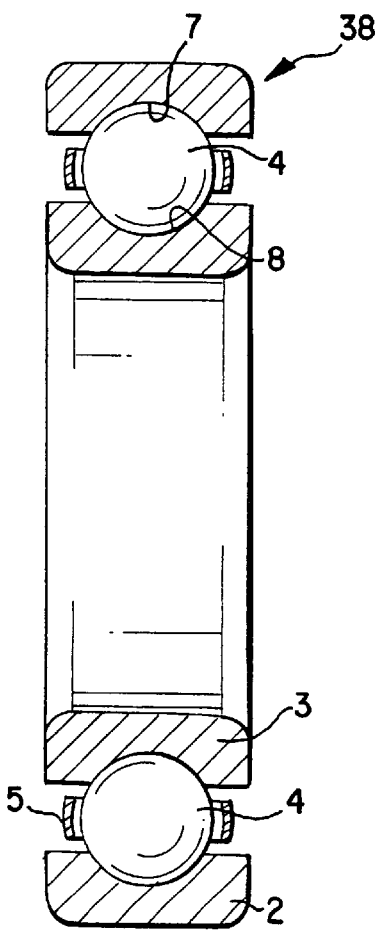
FIG. 7 is a cross sectional view of an example of the embodiments of the ball bearing of the open type.

Next is a description of experiments carried out by the present inventor to confirm the effects of the present invention. These experiments used the seal ring fitted ball bearing 18 of the first example of the embodiments of the present invention shown in FIG. 1. Moreover as a comparative example, two types were used, namely the heretofore generally used open type ball bearing 38 (comparative example 1) which did not have a seal ring, as shown in FIG. 7, and the seal ring fitted ball bearing 1 (comparative example 2) having small gaps on the inner peripheral rim side as shown in FIG. 8.

With these experiments, the respective specimens were fitted to a test rig and the inner ring 3 rotated while lubricating the contacting portions of the outer ring raceway 7 and the inner ring raceway 8 and the rolling surfaces of the balls 4. The rolling fatigue life of the respective test pieces was then observed.

Figure 4:
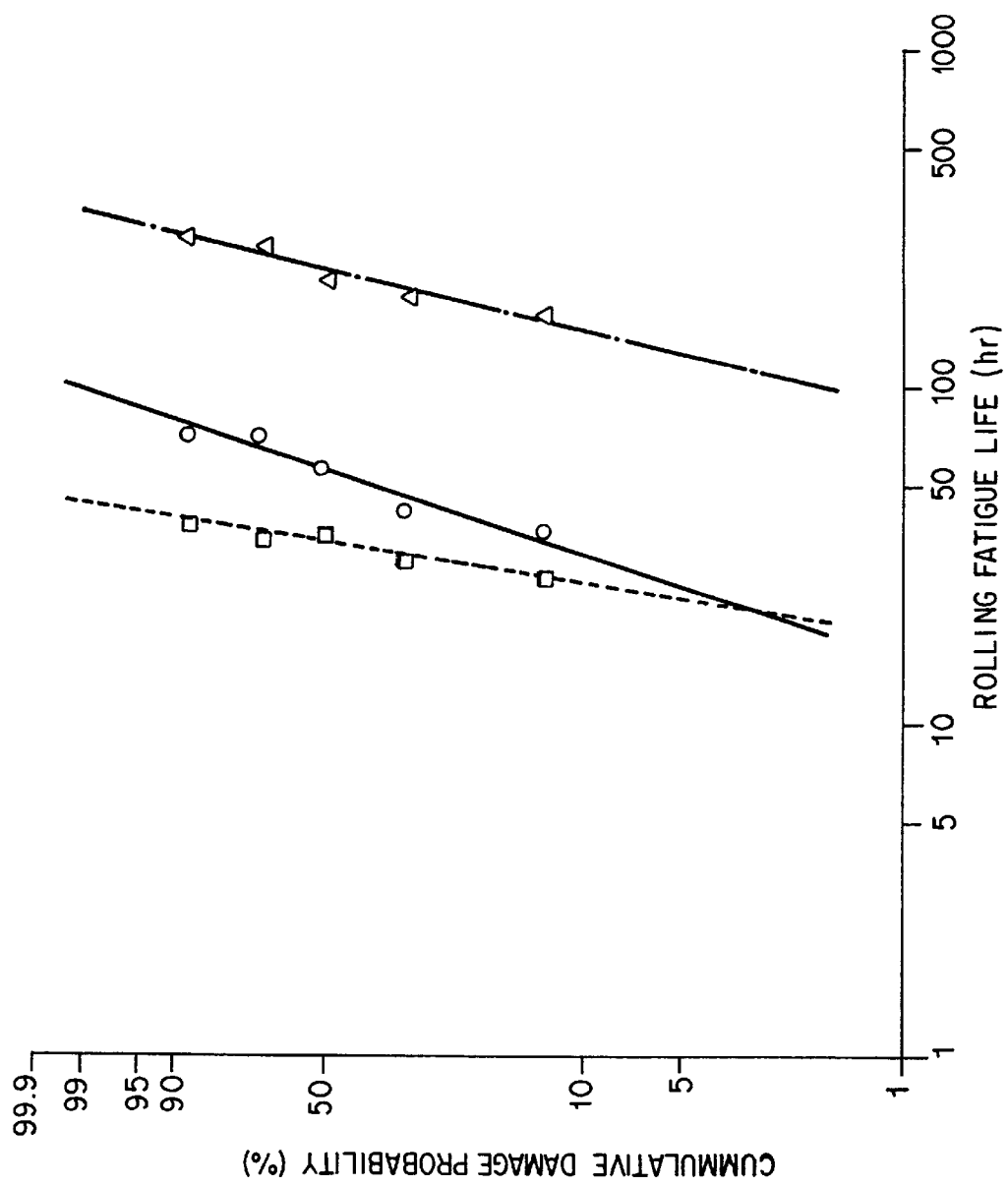
FIG. 4 is a graph to show a result of the experiments conducted to confirm the effects of the present invention.

The data of the ball bearings used in the respective tests, and the test conditions related to these tests are as follows.
1. Data for the ball bearings used: deep groove ball bearings with designation number 6206 (outer diameter 62 mm, inner diameter 30 mm, and width 16 mm)
2. Test conditions.
    Lubrication condition: test rig was run under the following conditions with the shaft secured inside the inner ring of the respective test pieces immersed in ATF (automatic transmission fluid) lubricating oil up to the axial center of the shaft.
    Rotational speed: 6000 rpm
    Radial load: 612 kgf.
    Oil temperature: 125° C.
    Foreign matter as described below was introduced to the ATF as follows; Weight of the foreign matter (particles) in the lubricating oil (ATF): 10–30 micron diameter particles, and 75–150 micron diameter particles, each at 100 ppm.
    Under the above conditions, the rolling fatigue life of the respective test pieces was obtained giving the results as shown in FIG. 4. In FIG. 4, (∆) is Example 1, (○) is Comparative Example 1 and (□) is Comparative Example 2. The horizontal axis shows the rolling fatigue life (time) of the respective test pieces, while the vertical axis shows the cumulative damage probability (%) of the respective test pieces.

The rolling fatigue life of the respective test pieces for when the damage condition was the same (when the cumulative damage probability was 10%) is shown respectively in Table 1.

As is clear from FIG. 4 and Table 1, the rolling fatigue life of the seal ring fitted ball bearing of the present invention was longer than the rolling fatigue life of the Comparative Examples 1 and 2. More specifically, with Example 1 according to the present invention, it was verified that a rolling fatigue life of more than 4.5 times that for Comparative Example 1, was obtained.

TABLE 1

| | Rolling fatigue life$_{10}$ (time) | Life ratio |
| --- | --- | --- |
| Comparative Example 1 | 32.32 | 1 |
| Comparative Example 2 | 25.09 | 0.80 |
| Example 1 | 144.73 | 4.62 |

The present invention, due to the above described construction and operation realizes a seal ring fitted ball bearing having low torque and long life at a low cost. Furthermore, the invention realizes a low cost transmission for automobiles having minimal power loss and excellent durability.

What is claimed is:

1. A bearing for use in a transmission for automobiles comprising:
    an outer ring,
    an inner ring,
    a plurality of balls, and
    a single seal ring on each side of the bearing, each seal ring having an inner peripheral edge fixed to the inner ring and an outer peripheral edge, each outer peripheral edge being spaced from the outer ring such that a small gap is formed between each outer peripheral edge and the outer ring, wherein the bearing is adapted to support a transmission shaft for transmitting power force.

2. A bearing for use in a transmission for automobiles comprising:
    an outer ring,
    an inner ring,
    a plurality of balls, and
    a plurality of seal rings each having an inner peripheral edge fixed to the inner ring and an outer peripheral edge, each outer peripheral edge being spaced from the outer ring such that a small gap is formed between each outer peripheral edge and the outer ring, wherein the bearing is adapted to support a transmission shaft for transmitting power force.

3. The bearing of claim 2, wherein the inner peripheral edge of the seal rings are provided with a passage for supply of lubricant oil.

4. The bearing of claim 2, wherein a labyrinth seal with a small gap is formed between the outer peripheral edge of the seal rings and a corresponding inner peripheral face portion of the outer ring, such that the small gap has a diameter which increases toward the outside of the bearing.

5. A bearing as defined in claim 2, wherein said inner and outer rings define an oil-receiving chamber and said gaps communicate with said chamber.

* * * * *